Sept. 13, 1932. T. K. CUMMINS 1,877,730
DROP BRAKE
Filed Nov. 16, 1929  3 Sheets-Sheet 3
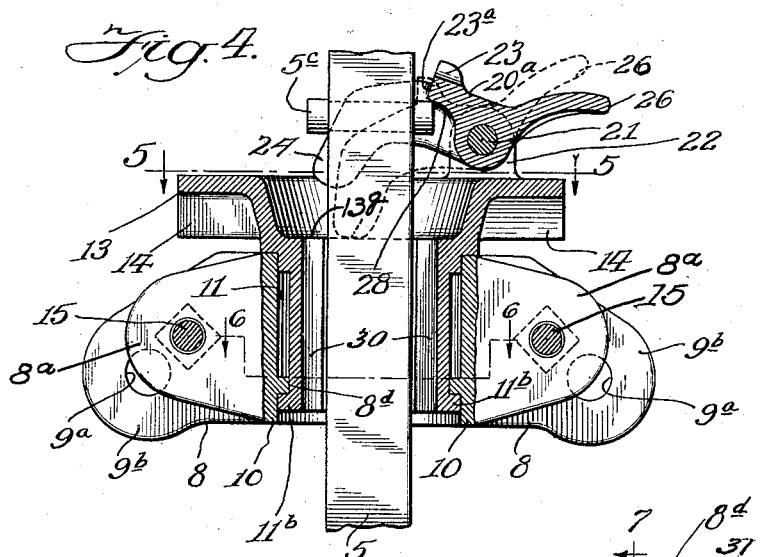
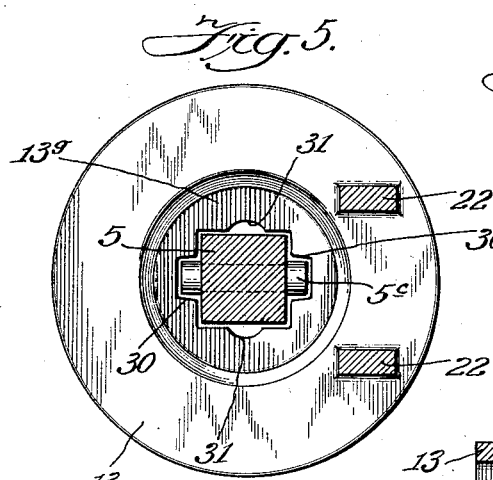
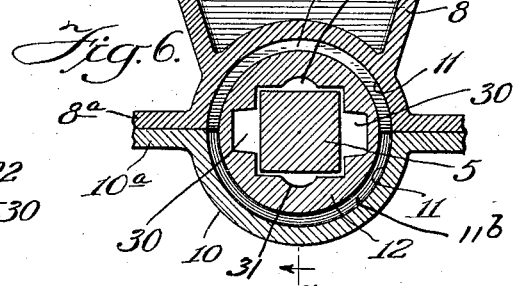
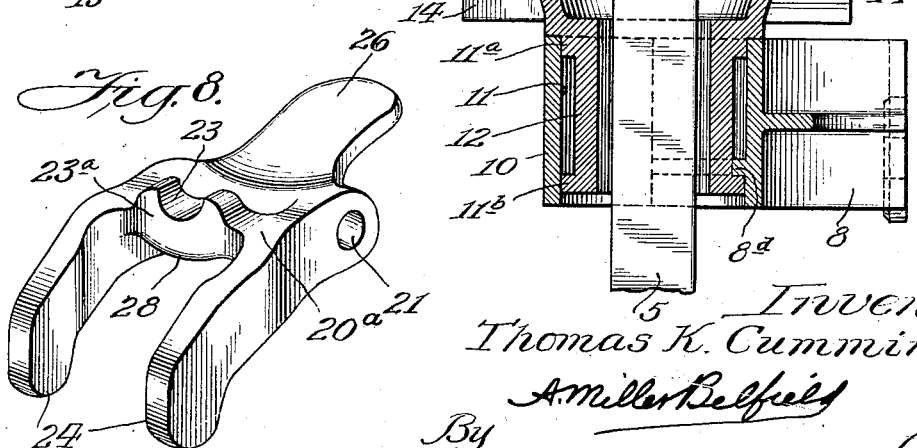
Inventor
Thomas K. Cummins
By A. Miller Belfield
Atty.

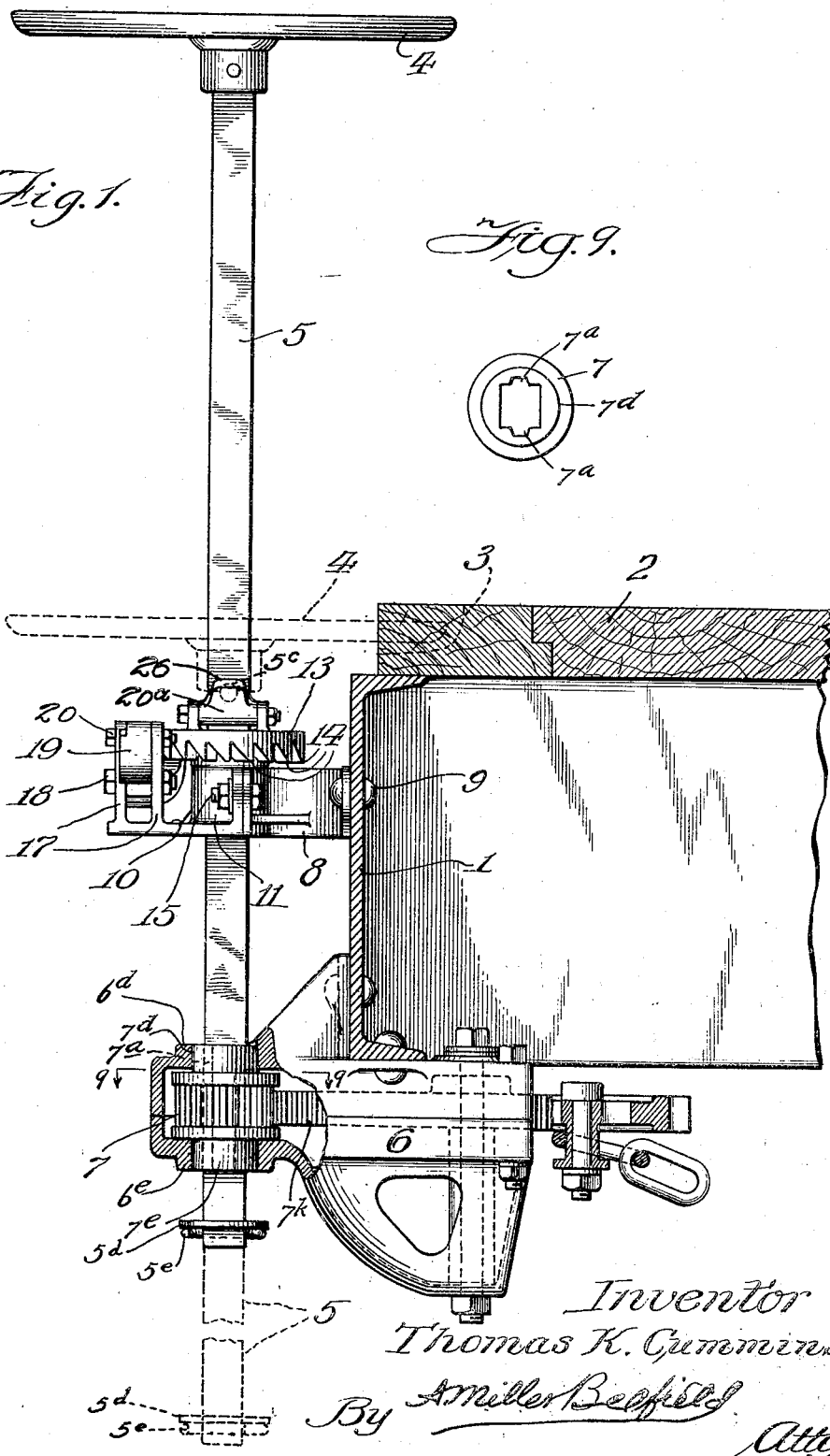

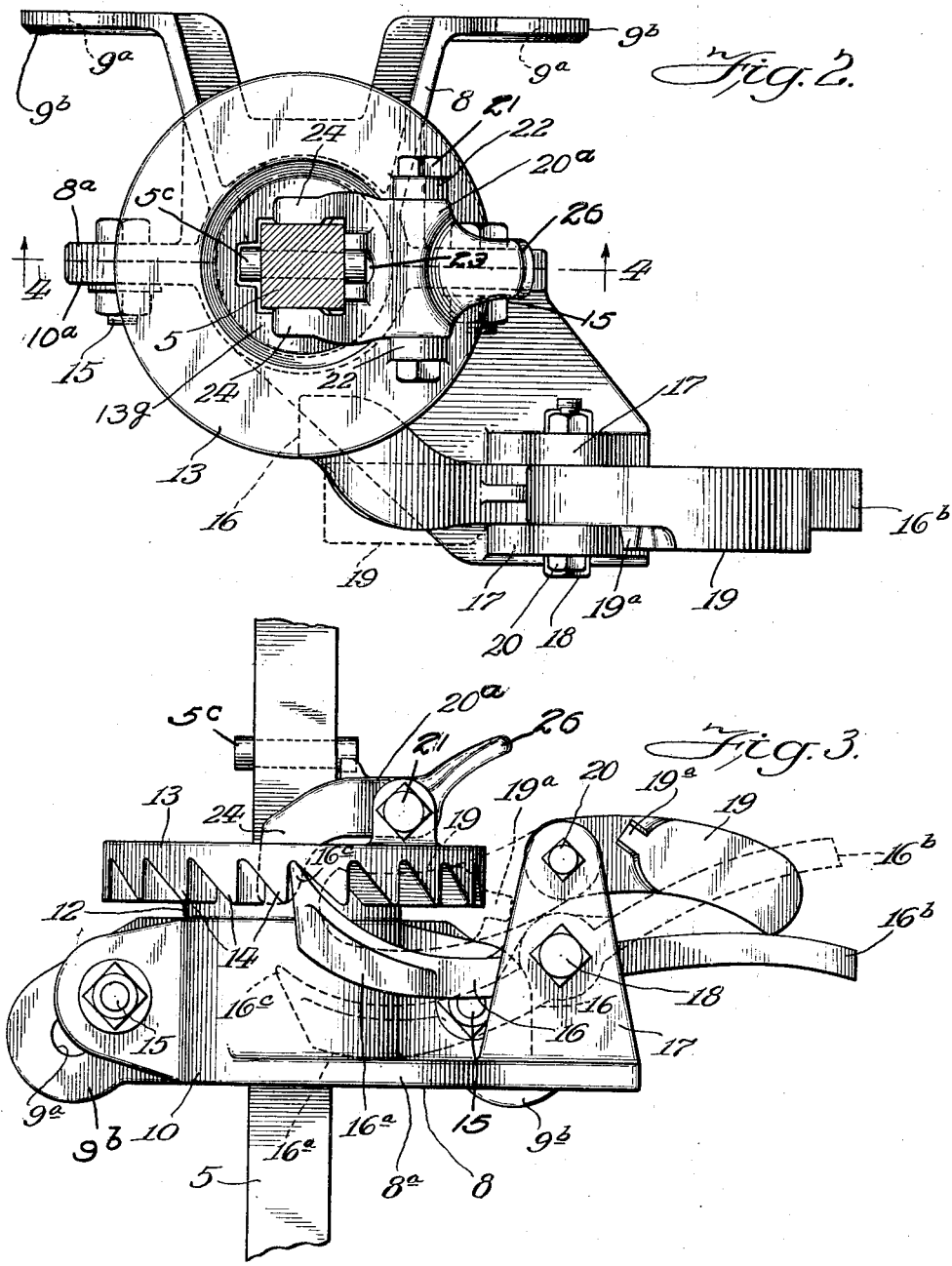

Patented Sept. 13, 1932

1,877,730

UNITED STATES PATENT OFFICE

THOMAS K. CUMMINS, OF ST. PAUL, MINNESOTA, ASSIGNOR TO NORTHERN MALLEABLE IRON COMPANY, OF ST. PAUL, MINNESOTA, A PARTNERSHIP OF MINNESOTA

DROP BRAKE

Application filed November 16, 1929. Serial No. 407,686.

My invention relates to drop brakes so-called, wherein a shaft or staff carrying a handwheel and projecting above the floor of a flat bottomed car and arranged to operate brake devices below, by means of a drum and chain to be wound thereon and said staff and wheel adapted, by special mechanisms, to be dropped below the level of the floor for the purpose of getting the wheel out of the way for loading and unloading the car.

One of the objects of the invention is to provide special mechanism for dropping or raising the wheel, whereby the operator may do so from a standing position on the car without danger to himself.

Another object of the invention is to provide an arrangement whereby the operator is able to release a locking latch with his foot while in a standing position and hold on to the wheel with both hands, and thus have full control and be better able to overcome resistance due to any part of the mechanism becoming frozen or rusted.

Another object of the invention is to provide a gravity controlled ratchet and wheel for locking the brake mechanism and arranging the parts so as not to interfere with the proper action of the brake operating mechanism in any position of the associated parts.

Another object is to attain these and other ends as will hereinafter more fully appear.

In the drawings:

Fig. 1 is a side view of the invention as applied to the end sill of a flat car, with certain parts in section and with other parts broken away to disclose the construction.

Fig. 2 is a plan of some of the parts shown in Fig. 1.

Fig. 3 is a front elevation of the parts shown in Fig. 2.

Fig. 4 is a section at the line 4—4 of Fig. 2.
Fig. 5 is a section at the line 5—5 of Fig. 4.
Fig. 6 is a section at the line 6—6 of Fig. 4.
Fig. 7 is a section at the line 7—7 of Fig. 6.
Fig. 8 is a perspective view of a latch device.

Fig. 9 is a detail of the pinion taken at the line 9—9 of Fig. 1.

The end sill of a car is shown at 1, to which the brake operating mechanism is attached. 2 is the floor and has a segmental portion at 3 removed therefrom to accommodate the hand wheel 4 when it is dropped in its lowered position as indicated by the dotted lines in Fig. 1.

The hand wheel 4 is secured to the brake staff 5, which is mounted for operating the brake setting devices generally indicated at 6, which includes a pinion 7 through which the brake staff 5 may freely slide, but will be rotated thereby because of the staff being non-circular, preferably square in cross-section, as indicated.

Above this pinion 7 is a ratchet device mounted in a bracket 8, which is secured to the end sill 1 as by rivets 9 taking through the holes $9^a$ in the flanges $9^b$. The bracket 8 has a cap 10 and together form a journal 11 for the hub 12 of a ratchet wheel 13 having teeth 14 on the lower side thereof. The bracket 8 and the cap 10 are secured together by bolts 15 and the ears $8^a$ and $10^a$ respectively. The outer surface of the hub 12 is cut away leaving only the bearing surface at $11^a$ near the top of the flange $11^b$ at the lower end of the hub. An annular rib $8^d$ formed in the bracket member 8 serves to retain the wheel in position by engagement with the flange $11^b$.

Cooperating with the ratchet wheel 13 is a pawl 16 mounted in upstanding ears 17—17 formed on the bracket 8 and pivoted at 18.

This pawl is formed with an extension $16^b$ beyond its fulcrum or pivotal point 18, and the pawl proper has the weight $16^a$ formed thereon for overbalancing the extension $16^b$, so that when it is free to do so the pawl will drop out of engagement with the teeth of the ratchet wheel.

For causing the pawl to cooperate with the ratchet wheel for locking the brake staff, a swinging weighted arm 19 conveniently pivoted at 20 above the pawl fulcrum 18 in the ears 17 is provided and arranged to overlie and contact the extension $16^b$ of the pawl 16 and the weight of the arm is calculated to overcome the weight $16^a$ of the pawl.

When it is desired to release the ratchet wheel 13, the arm 19 (see Figs. 2 and 3) is swung away from the extension 16ᵇ and onto the pawl 16; the arm 19 thus adds its weight to that of the weight 16ᵃ of the pawl and assists in releasing the parts. It will be noted that the arm 19 thus acts in a dual capacity, lending its weight in both its positions.

This arm 19, however, need not and does not follow the pawl downward beyond a point where its end 16ᶜ frees the teeth 14, whereupon the pawl will fall to rest on the extension flange 8ᵃ of the bracket 8, and the arm 19 will be arrested when its projecting lug 19ᵃ contacts one of the ears 17, leaving a space between the lower side of this arm and the upper surface of the pawl 16 (as indicated by the dotted lines in Fig. 3), for convenience in returning the arm 19.

So that the arm 19 may properly cooperate with the weighted end 16ᵃ and not interfere with the ratchet wheel 13, the pawl 16 is formed with an offset (see Fig. 2), so that its main body portion lies outside the boundary of the ratchet wheel 13 and the end 16ᶜ extending inwardly in a position to engage the teeth 14; thus the weighted arm 19 is, in both positions, also outside of the boundary of the wheel 13.

The brake staff 5 for operating the brake controlling device 6 by means of the pinion 7 is mounted for vertical movement through the squared apertures in the pinion 7 and the ratchet wheel 13, and for holding it in the raised or operative position, (indicated by the full lines in Fig. 1) a latch 20ᵃ is pivoted at 21 in upstanding lugs 22—22 which are cast integral with the wheel 13 and this latch 20ᵃ is arranged to engage a pin 5ᶜ in the staff 5. The latch 20ᵃ has two fingers 24—24 which span the staff and extend downward and rest upon the flat surface or bottom 13ᵍ of the ratchet wheel 13. The portion of the latch which engages the pin 5ᶜ is formed with an arcuate notch 23 which is calculated to fit the curvature of the pin 5ᶜ thus providing maximum bearing surface for prolonging the life of the contacting parts.

The bolt at 21 and the fingers 24—24 support the latch so that the vertical face 23ᵃ will be held away from the adjacent surface of the staff and will not interfere with its free vertical movement; it will be noted that if means were not provided to avoid contact, the latch might interfere, especially in the downward movement of the staff 5.

The latch 20ᵃ has tongue 26 which extends upward for convenience in operating the latch; this tongue 26 is arranged to be depressed for releasing the latch, and this may be done by the operator by placing his foot thereon while holding the wheel as previously stated.

For locking the staff in its raised position it is only necessary to raise the wheel from the position shown in dotted lines in Fig. 1 to the full line position, and when the pin 5ᶜ approaches the under side 28 of the latch it will assume the position shown in Fig. 4 which shows the pin raising the latch and upon a slight further upward movement the pin will pass the latch and allow the latter to drop down to the position indicated in dotted lines in that figure.

The provision of an abutment projecting from the staff for engagement with the latch is here shown as a pin 5ᶜ driven through the staff and secured in position in any desirable manner as by slightly upsetting the extruded ends which are, as shown of equal dimensions so that either will operate, and when one end becomes worn the other may be substituted, that is by rotating the staff 180 degrees.

Recesses 30—30 in the hub 12 of the wheel 13 are provided to allow the projecting ends of the pin 5ᶜ to pass through in the vertical movement of the staff; the recesses 31—31 are merely for decreasing the fractional surface of the square bore.

To provide a satisfactory rotating bearing for the lower end of the staff 5, the pinion 7 has a circular hub, which has the upper and lower extensions 7ᵈ and 7ᵉ and is rectangularly bored to fit the staff 5. The grooves 7ᵃ—7ᵃ (see Fig. 9) in the hub are to permit the pin 5ᶜ to pass through for lowering the handwheel and the staff.

The bracket of the brake operating mechanism 6 has journals 6ᵈ and 6ᵉ for the hub extensions 7ᵈ and 7ᵉ respectively. The pinion is of such width or face as will fit in the bracket and prevent longitudinal displacement thereof, thereby maintaining its proper relation with respect to the gear 7ᵏ of the brake operating mechanism.

To limit the upward movement of the staff 5 and prevent its withdrawal through the pinion 7, a washer 5ᵈ is passed over the lower end thereof and a cotter pin 5ᵉ of suitable size is fixed in a hole bored near the lower end below the washer 5ᵈ.

Many changes and modifications may be made to and of this and other features without departing from the spirit of the invention.

What I claim is:

1. In a device of the character specified including a brake staff mounted for vertical and rotary movement, a ratchet wheel associated with the staff, a bracket for mounting the ratchet wheel, lugs on the bracket, a pawl cooperating with the said ratchet wheel and fulcrumed in the said lugs, the said pawl arranged to drop for disengagement from the said ratchet wheel and a weighted arm also fulcrumed in the said lugs and cooperating with the pawl in its disengaging movement, said arm having means thereon for stopping its descent in said disengaging movement beyond a point where the pawl becomes free from the ratchet wheel and the pawl continuing therefrom whereby a space results between the underside of the arm and the top of the pawl for ease of manipulation.

2. In a device of the character specified including a brake staff mounted for rotary and vertical movement, a ratchet wheel associated with the staff for rotation therewith, lugs on the ratchet wheel, a latch mounted in the said lugs, stop fingers on the latch spanning the staff, and an abutment on the staff for engaging the said latch.

3. In a device of the character specified including a brake staff mounted for rotary and vertical movement, a movable latching member for locking the staff in its upper operative position, an abutment on the staff cooperating with said member, a pinion arranged to be rotated by said staff, means for holding said pinion against axial movement while the said staff is being moved longitudinally, a groove in the bore of the said pinion for accommodating the said abutment on the said staff in its vertical movement and means for holding said mechanism in a braking position, comprising a ratchet wheel having a non-circular aperture therein through which said staff passes.

4. In a drop brake mechanism, a ratchet member having a vertically positioned non-circular opening therethru, a brake staff slidably mounted in said opening, pivotally mounted gravity operated means associated with said member for locking said brake staff in a raised position, and pivotally mounted foot operable mechanism for releasing said locking means.

5. In a drop brake mechanism, a ratchet member having a vertically positioned non-circular opening therethru, a brake staff slidably mounted in said opening, automatic means associated with said member for locking said brake staff in a raised position, and pivotally mounted foot operable mechanism for releasing said locking means.

6. In a drop brake mechanism, a ratchet member having vertically extending non-circular opening therethru, a brake staff slidably mounted in said opening, gravity operated means associated with said member for locking said brake staff in a raised position, means on said staff for cooperating with said gravity operated means, and pivotally mounted foot operable mechanism for releasing said locking means.

7. In a drop brake mechanism, a ratchet member having vertically extending non-circular opening therethru, a brake staff slidably mounted in said opening, automatic means associated with said member for locking said brake staff in a raised position, means on said staff for cooperating with said automatic means, and pivotally mounted foot operable mechanism for releasing said locking means.

8. The combination of a railway car and drop brake mechanism mounted thereon comprising, a mounting member having a vertically extending non-circular opening therethru, a brake staff slidably mounted in said opening, and gravity operated means comprising a foot operated latch associated with said mounting member for locking said brake staff in a raised position, said latch located above the mounting member adjacent to the floor line of a car upon which the mechanism is mounted and readily accessible to be actuated by downward foot pressure.

9. The combination of a railway car and drop brake mechanism mounted thereon comprising, a mounting member having a vertically positioned non-circular opening therethru, a brake staff slidably mounted in said opening, gravity operated means associated with said member for locking said brake staff in a raised position, and foot operable mechanism for releasing said locking means, said mechanism located above the mounting member adjacent the car floor and readily accessible to be operable by downward foot pressure.

10. A drop brake mechanism comprising a vertically positioned non-circular brake staff, a ratchet wheel having a non-circular opening therethru forming a mounting therefor, means on said ratchet wheel for supporting latch means, and latch means for engaging said brake staff for supporting the same in a raised position.

11. A drop brake mechanism comprising a vertically positioned non-circular brake staff, a ratchet wheel having a non-circular opening therethru forming a mounting therefor, latch means associated with said ratchet wheel, a pair of lugs on said ratchet wheel for supporting the same, an abutment on said staff for engaging said latch means, and an extension on said latch means for disengaging the latch by a downward pressure on said extension.

12. A drop brake mechanism comprising a vertically positioned brake staff, a ratchet wheel having an opening therethru forming a mounting therefor, a latch mounted upon said ratchet wheel, and an abutment on said staff for engaging said latch, said ratchet wheel opening having enlargements therein for accommodating said abutment on said staff.

In witness whereof, I hereunto subscribe my name this 15th day of October, A. D., 1929.

THOMAS K. CUMMINS.